(Specimens.)
J. H. BEVINGTON.
SPINNING TUBE.
No. 444,721.     Patented Jan. 13, 1891.
2 Sheets—Sheet 1.
Fig. I.
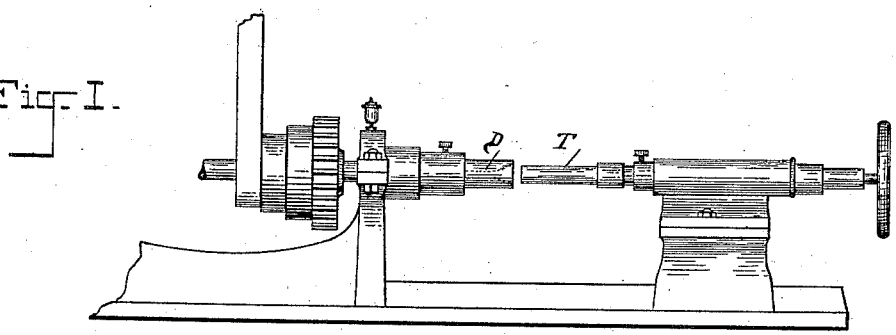
Fig. Iᵃ.
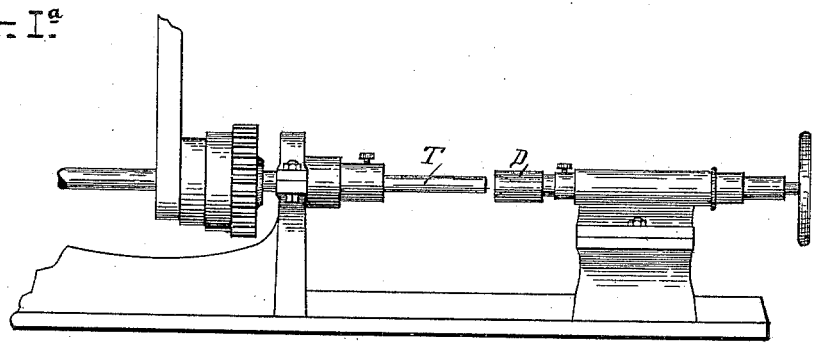
Fig. II.
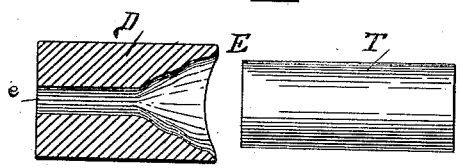
Fig. IV.
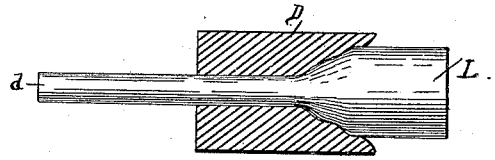
Fig. III.
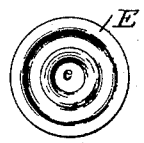
Witnesses
Lillie Hanner
George S. Bell
Inventor
James H. Bevington
By Knight Bros.
Attys.

(Specimens.)
J. H. BEVINGTON.
SPINNING TUBE.
No. 444,721.
2 Sheets—Sheet 2.
Patented Jan. 13, 1891.
Fig. V.
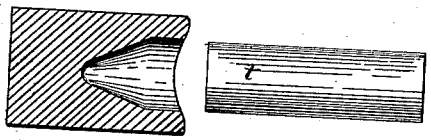
Fig. V.ª
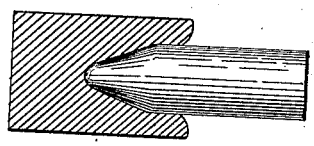
Fig. VI.
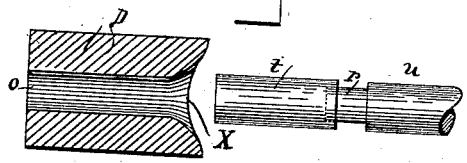
Fig. VII.
Fig. VIII.
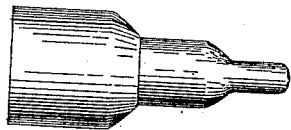
Fig. IX.
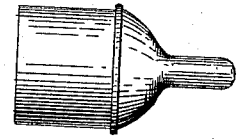
Fig. X.
Fig. XI.
Fig. XII.
Witnesses
Lillie Hanna
George S. Bell
Inventor
James H. Bevington
By Knight Bros
Attys.

UNITED STATES PATENT OFFICE.

JAMES H. BEVINGTON, OF PEORIA, ILLINOIS, ASSIGNOR TO THE PEORIA METAL SPINNING COMPANY, OF ILLINOIS.

SPINNING TUBES.

SPECIFICATION forming part of Letters Patent No. 444,721, dated January 13, 1891.

Application filed April 8, 1890. Serial No. 347,067. (Specimens.)

*To all whom it may concern:*

Be it known that I, JAMES H. BEVINGTON, a citizen of the United States, residing at Peoria, county of Peoria, State of Illinois, have invented certain new and useful Improvements in Spinning Tubes, of which the following is a specification.

My invention relates to the formation of tubes and other articles and to providing means for closing them at the ends or for reducing or increasing their diameter, or welding or joining the ends of two or more tubes together, as will be hereinafter described.

My invention consists in employing a hard metal die or former suitably mounted upon the spindle of a lathe, said die or former provided with a smooth recessed face or with a smooth longitudinal perforation, or with both, as may be required. This recessed face or perforation receives the tube or other article to be formed. When the die is revolved to sufficient velocity, the tube or other article forced into the die or former becomes intensely heated from frictional contact, thereby softened and made susceptible of being reduced, closed, or otherwise formed in any suitable or desired manner. In the process the article to be formed may be revolved while the die remains at rest, or both revolved in opposite directions, as convenience may suggest.

Referring to the accompanying drawings, which form a part of this specification, Figure I represents a side elevation of a lathe for spinning tubes or other articles according to my method. Fig. I$^a$ is a similar view with the parts transposed. Fig. II represents a longitudinal section of a die or former used in my process of reducing a metal tube to one of smaller diameter. It also shows the tube before being operated upon. Fig. III is an end elevation of the die or former. Fig. IV shows the tube and die after the tube has been operated upon. Fig. V is a longitudinal section of a die where it is desired to close the end of the tube. The tube is also shown. Fig. V$^a$ is a view showing the operation completed. Fig. VI represents the die used to weld two tubes together for the purpose of lengthening the same. Figs. VII, VIII, IX, X, XI, and XII represent some of the different results accomplished by my process of reducing and increasing the diameter and closing the ends of metal tubes.

In Fig. I, D represents a hard metal die or former securely held in the hollow spindle of a lathe, and T a metal tube about to be forced into the hard metal die D by means of the tail-stock screw or lever. The die D is revolved at a high rate of speed and receives the tube, which, coming in contact with the die, is softened by reason of the intense heat generated by frictional contact. The position of these parts may be reversed, as shown at Fig. I$^a$, which represents the die inserted in the tail-stock of the lathe and securely held by same, T representing the tube inserted in the spindle and revolving rapidly. It receives the die, which is forced into it by the tail-stock screw or lever.

In Figs. II and III, I show the die in longitudinal section and in front elevation. This die is for the purpose of forming tubes with small termini, E representing the large opening or entrance and $e$ the small opening or exit. At T, I show the tube about to enter the die.

Fig. IV represents the die as having received the tube and reduced and formed it, as desired, with a small opening at $d$ and a large opening at L.

Fig. V represents the central view of the die, whereby the ends of a tube are securely closed and welded by means of the tube striking the wall, which bends, closes, and securely welds the end of a tube in a smooth manner. $t$ represents the tube about to enter. Fig. V$^a$ represents this completed tube closed at the end.

In Fig. VI, I represent a die in longitudinal section. X represents the opening of the die to receive two tubes to be welded together. $t$ represents a tube. $u'$ represents another tube slightly larger, which first having its end reduced, as at $r$, to enable it to be inserted into the first tube. The tubes are now forced into the die D, and the moment the tube $u$ comes in contact with the die it becomes reduced, and by reason of the intense heat generated by the frictional contact of the rapidly-revolving die is immediately welded to the tube $t$, and passes out of the opening $o$ reduced to the same size and thickness as tube $t$.

Having thus described my invention, the following is what I claim as new therein and desire to secure by Letters Patent:

1. The method of spinning metal by forcing it into or through a die of harder metal revolving at a high rate of speed, so that the softer metal is heated by the friction between the parts, whereby the metal may be more easily spun or formed.

2. The method of forming tubes and other articles and reducing or increasing their diameter and welding tubes together by frictional contact by means of a revolving die or former, as hereinbefore described.

JAMES H. BEVINGTON.

Witnesses:
CHARLES W. ROBISON,
JULIUS G. BOHL.

It is hereby certified that Letters Patent No. 444,721, granted January 13, 1891, upon the application of James H. Bevington, of Peoria, Illinois, for an improvement in "Spinning-Tubes," was erroneously issued to "The Peoria Metal Spinning Company" as owner of the patent; that said Letters Patent should have been issued to said Bevington, as sole owner, he being the owner of the entire interest, as shown by the assignments of record in this Office; and that the said Letters Patent should be read with this correction therein that the same may conform to the record of the case in the Patent Office.

Signed, countersigned, and sealed this 3d day of February, A. D. 1891.

[SEAL.]

Countersigned:
    C. E. MITCHELL,
        *Commissioner of Patents.*

CYRUS BUSSEY,
*Assistant Secretary of the Interior.*